United States Patent [19]

Nagamitsu et al.

[11] Patent Number: 5,823,518
[45] Date of Patent: Oct. 20, 1998

[54] SPRING GUIDE RETAINER

[75] Inventors: Tatsuo Nagamitsu, Powell; Robert Duane Dye, Huntsville, both of Ohio

[73] Assignee: Honda Engineering North America, Marysville, Ohio

[21] Appl. No.: 800,776

[22] Filed: Feb. 14, 1997

[51] Int. Cl.⁶ .............................. B60G 11/14; F16F 1/06
[52] U.S. Cl. ..................... 267/291; 267/169; 403/229; 72/351
[58] Field of Search ............................ 267/3, 4, 74, 119, 267/136, 137, 169, 170, 174–179, 195, 202, 221, 222, 225, 287, 291; 403/220, 229; 72/313, 351

[56] References Cited

U.S. PATENT DOCUMENTS 1,811,987  6/1931  Wales ............................... 267/291
3,030,056  4/1962  Rogers ............................. 267/269

FOREIGN PATENT DOCUMENTS 0616473  7/1978  U.S.S.R. ........................... 267/169
1573254  6/1990  U.S.S.R. ........................... 267/291

Primary Examiner—Robert J. Oberleitner
Assistant Examiner—Chris Schwartz
Attorney, Agent, or Firm—Barbara Joan Haushalter

[57] ABSTRACT

A spring guide retainer is provided for preventing buckling of a spring during spring compression as an upper die moves toward a lower die in a stamping operation. The spring guide retainer comprises a spring guide housing to hold the spring location, a spring guide holder fixed to the upper die to promote spring alignment, and a spring guide pin to maintain alignment of the spring. A screw associated with the spring guide pin is receivable through a pocket of the spring guide housing to secure the spring guide pin and the spring guide housing to the pad.

8 Claims, 2 Drawing Sheets

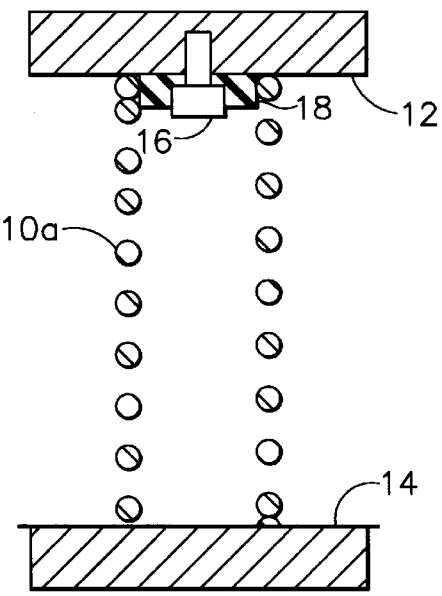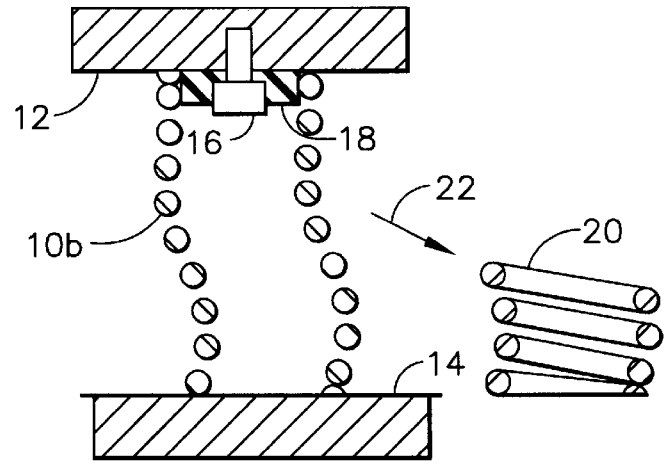
FIG. 1A (PRIOR ART)
FIG. 1B (PRIOR ART)
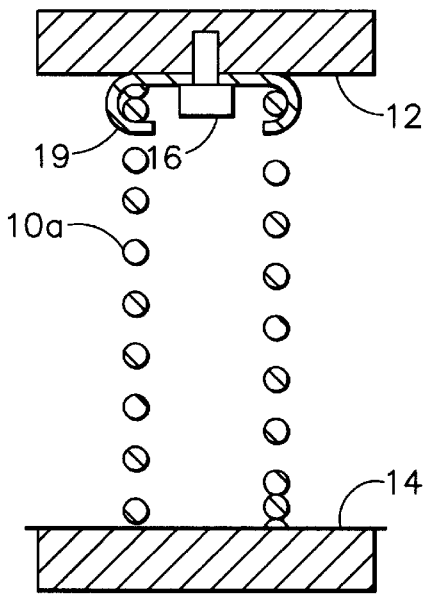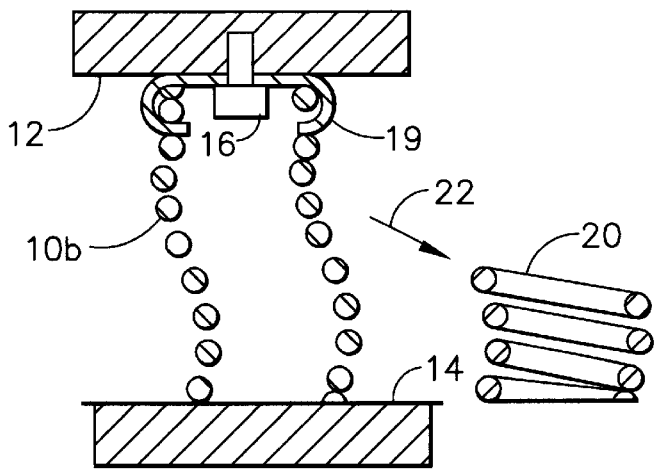
FIG. 2A (PRIOR ART)
FIG. 2B (PRIOR ART)

SPRING GUIDE RETAINER

FIELD OF THE INVENTION

This invention relates generally to stamping dies, and particularly to a spring guide retainer for a stamping die.

BACKGROUND OF THE INVENTION

Generally, a stamping operation is used on sheet metal for automobile bodies and the like. A stamping die is used in the stamping operation to form the sheet metal. The stamping tool, comprising the die, is set on a press machine for forming. In the stamping die construction, an upper die is set on a slide of a press machine, and a lower die is set on a press bolster. As the upper die descends, a spring situated between the upper and lower dies compresses, and a pad associated with the upper die contacts the workpiece and holds it in position. As the upper die compresses the spring, the sheet metal situated between the dies is formed to the required shape, as defined by the dies.

A number of methods exist in the prior art for holding the spring. One method uses a steel spring clip with a bent edge to hold the spring. The clip is fixed to the upper die by attachment means, such as a bolt. Another method proposes using urethane to hold the spring. However, these existing methods only hold the spring, but cannot prevent buckling and scattering. Another prior art method which attempts to both hold the spring and prevent buckling and scattering comprises a guide pin and a plate for holding the spring between the pin and the pad. Unfortunately, this method requires an upper die thickness greater than usual, since at the bottom die, the guide pin head is going into the upper die a distance equal to spring stroke.

Consequently, the prior art methods have a variety of problems, including broken clips and springs, torsional stress, and buckling and scattering of the spring when the spring is broken. These problems create the additional problem of die damage, resulting from the scattering of the spring flakes. During production, it is very typical for springs to be broken, causing all of these associated problems to occur.

It is seen then that there exists a need for an apparatus which prevents the problems associated with prior art methods of spring retention.

SUMMARY OF THE INVENTION

This need is met by the spring guide retainer according to the present invention, wherein spring damage is prevented, thereby eliminating scattering of broken spring pieces in the die.

In accordance with one embodiment of the present invention, a spring guide retainer is provided for preventing buckling of the spring during spring compression as the upper die moves toward the lower die in a stamping operation. The spring guide retainer comprises a spring guide housing to hold the spring location, a spring guide holder fixed to the upper die to promote spring alignment, and a spring guide pin to maintain alignment of the spring.

It is an advantage of the present invention that the spring is always held inside its coil, to align and hold the spring. It is a further advantage of the present invention that the spring guide retainer of the present invention prevents buckling of the spring during compression. Finally, the spring guide retainer of the present invention is such that it would prevent scattering of the spring even if the spring were broken.

Other objects and advantages of the invention will be apparent from the following description, the accompanying drawings and the appended claims, to which reference may be had for a full understanding of the nature of the present invention.

BRIEF DESCRIPTION OF THE DRAWINGS

In the Drawings:

FIGS. 1A, 1B, 2A and 2B illustrate the problems associated with prior art spring configurations.

DESCRIPTION OF THE PREFERRED EMBODIMENT

Figure 3A:
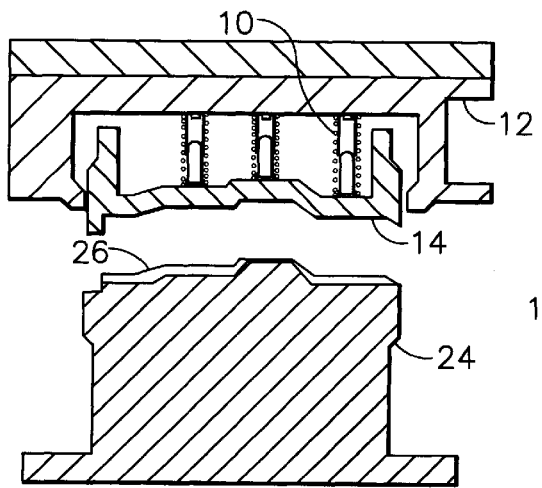
FIGS. 3A, 3B, 4A and 4B illustrate the spring guide retainer according to the present invention, for eliminating the problems associated with prior art configurations.

The present invention provides for a spring guide retainer capable of preventing spring damage and scatter of springs in a stamping die environment.

Referring to the drawings, FIGS. 1A, 1B, 2A and 2B illustrate the problems typically associated with prior art stamping die spring configurations. In FIGS. 1A and 2A, spring 10a is shown in a resting configuration, situated between upper die 12 and pad 14 associated with the upper die for contacting the workpiece and holding it in position. FIG. 1A illustrates a urethane mounting spring holding configuration and FIG. 2A illustrates a clip spring hold configuration. If FIG. 1A, urethane 18 is fixed on upper die 12 by bolt 16 to adhere spring 10a to the upper die. In FIG. 2A, clip 19 is fixed on upper die 12 by bolt 16, and "clips" the spring 10a to the upper die.

Although the configurations of FIGS. 1A and 2A hold the spring during compression, buckling and scattering cannot be prevented, as illustrated in FIGS. 1B and 2B. As can be seen in FIGS. 1B and 2B, when spring 10b is compressed, the spring tends to buckle, and often breaks altogether. This, in turn, causes scattering of spring pieces 20, as illustrated by arrow 22. If the spring breaks, flakes can scatter onto pad 14, resulting in die damage and associated problems, and further requiring time-consuming repair.

Figure 3B:
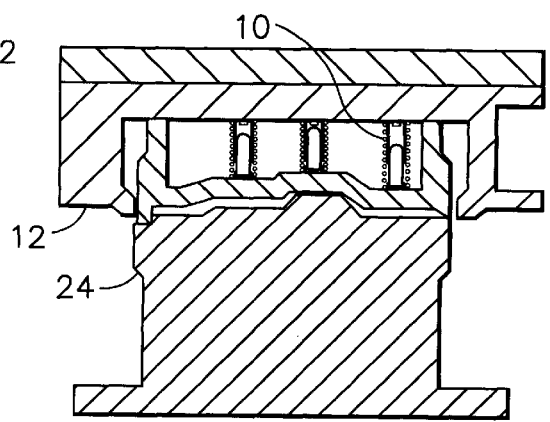

Referring now to FIGS. 3A and 3B, a stamping die is illustrated, incorporating the spring guide retainer of the present invention. Since the spring 10 is located inside the upper die, hidden from view of the operator by pad 14, spring break is not always noticed immediately, allowing further die damage to occur. Furthermore, when the spring break is found, the pad 14 must be removed from the upper die 12 to replace the spring, which can take several hours of labor. In FIG. 3A, upper die 12 is set on a slide of a press machine (not shown) and pad 14 covers spring unit 10. Lower die 24 is set on a press bolster (not shown). As the upper die descends toward the lower die, in accordance with the press slide operation, spring 10 is compressed. When pad 14 contacts the workpiece 26, the die has reached the closed position illustrated in FIG. 3B. The spring guide retainer of the present invention serves the dual purpose of guiding the spring and absorbing energy, to prevent spring buckling and scattering.

Figure 4A:
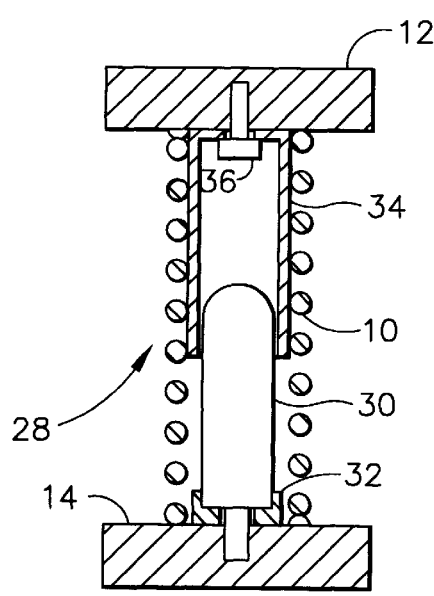
Figure 4B:
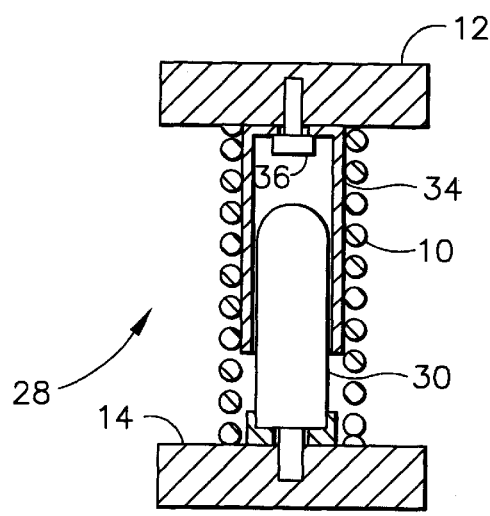

Referring now to FIGS. 4A and 4B, to prevent the problems associated with the spring configurations of FIGS. 1A, 1B, 2A and 2B, a spring guide retainer is provided, in accordance with the present invention. In FIG. 4A, spring 10 surrounds a spring guide retainer 28 of the present invention. The spring guide retainer comprises spring guide pin 30, spring guide housing 32 for locating the spring on the die, and spring guide holder 34, all preferably formed of steel material.

The spring guide pin 30 includes an attachment means, such as a screw (not shown), receivable through a pocket of the spring guide housing 32 which spring guide housing may be any suitable means, including a nut. The screw continues into the pad 14, affixing the spring guide pin and the spring guide housing to the pad, as shown in FIGS. 4A and 4B. Spring guide pin 30 attached to spring guide housing 32 also cooperatively associates spring guide housing 32 with die 12. Fixing bolt 36 fixes spring guide holder 34 to upper die 12. Spring guide holder 34 cooperates with spring guide pin 30, slidably receivable into spring guide holder 34, to align the spring 10 throughout compression, and also prevent scattering, since the spring 10 cannot buckle. As can be readily seen in FIG. 4B, compression of spring 10 no longer causes buckling and, therefore, eliminates scattering of the spring. Even if the spring were to break, scatter of the spring is prevented by the spring guide pin and spring guide holder because the broken spring is contained by the spring guide retainer, eliminating problems associated with prior art configurations.

Having described the invention in detail and by reference to the preferred embodiment thereof, it will be apparent that other modifications and variations are possible without departing from the scope of the invention defined in the appended claims.

What is claimed is:

1. A spring guide retainer for use with a spring associated with a stamping die, the stamping die having an upper die and a lower die, and further having a pad associated with the upper die for contacting a workpiece as the spring is compressed, the spring guide retainer comprising:

a spring guide housing for positioning the spring on the pad;

a spring guide pin attached to the spring guide housing for associating the spring guide housing with the upper die and such that it does not preload the spring; and a spring guide holder for receiving the spring guide pin during compression of the spring, providing tight clearance between the spring to the holder and the housing to maintain alignment of the spring during compression, wherein the spring guide holder is capable of attachment to the upper die.

2. A spring guide retainer as claimed in claim 1 further comprising an attachment means for holding the spring guide housing between the spring guide pin and the pad.

3. A spring guide retainer as claimed in claim 2 wherein the attachment means comprises a screw.

4. A spring guide retainer as claimed in claim 2 wherein the attachment means secures the spring guide pin and the spring guide housing to the pad.

5. A spring guide retainer as claimed in claim 1 wherein the spring guide pin and the spring guide holder prevent scatter of the spring.

6. A spring guide retainer as claimed in claim 1 wherein the spring guide housing is a steel material.

7. A spring guide retainer as claimed in claim 1 wherein the spring guide pin is a steel material.

8. A spring guide retainer as claimed in claim 1 wherein the spring guide holder is a steel material.

* * * * *